(12) United States Patent
Gray

(10) Patent No.: US 6,371,469 B1
(45) Date of Patent: Apr. 16, 2002

(54) EXPANDABLE MANDREL

(76) Inventor: David T. Gray, 27615 N. Lake Dr., Waterford, WI (US) 53185

( * ) Notice: Subject to any disclaimer, the term of this patent is extended or adjusted under 35 U.S.C. 154(b) by 0 days.

(21) Appl. No.: 09/588,424

(22) Filed: Jun. 6, 2000

(51) Int. Cl.⁷ .................................................. B23Q 3/14
(52) U.S. Cl. ...................... 269/48.1; 269/234; 269/309; 269/32; 269/296
(58) Field of Search ................................ 279/2.09, 2.12, 279/4.09, 75; 269/48.1, 309, 310, 32, 234, 296

(56) References Cited

U.S. PATENT DOCUMENTS

| | | |
|---|---|---|
| 1,921,316 A | 8/1933 | Mattern et al. |
| 1,959,008 A * | 5/1934 | Spaloss ..................... 279/4.09 |
| 2,226,078 A | 12/1940 | Spahn |
| 2,293,085 A * | 8/1942 | Stieber ....................... 279/2.09 |
| 3,747,445 A | 7/1973 | Piotrowski et al. |
| 4,106,784 A | 8/1978 | Davis |
| 4,387,845 A | 6/1983 | Mefferd |
| 4,430,024 A | 2/1984 | Guild et al. |
| 4,720,114 A | 1/1988 | Braitmaier et al. |
| 4,728,217 A | 3/1988 | Fink |
| 4,840,360 A | 6/1989 | Bartley |
| 4,932,642 A | 6/1990 | Salenbien et al. |
| 5,054,756 A | 10/1991 | Riemscheid et al. |
| 5,197,720 A | 3/1993 | Renz et al. |
| 5,388,814 A | 2/1995 | Riemscheid et al. |
| 6,241,228 B1 * | 6/2001 | Chupick ..................... 269/48.1 |

* cited by examiner

Primary Examiner—Robert C. Watson
(74) Attorney, Agent, or Firm—Andrus, Sceales, Starke & Sawall, LLP

(57) ABSTRACT

A workpiece holder features a grip post having an interior wall structure and an exterior wall structure defining a plurality of expandable sections adapted to engage the wall of a bore formed on a workpiece. The grip post houses a cam arrangement abutting the interior wall structure. A pin arrangement is movably mounted in the grip post and has a tapered head engageable with the cam arrangement. A fluid system is provided for instantaneously imparting longitudinal movement to the pin arrangement whereby the exterior wall structure of the grip post is expanded into gripping relationship with the workpiece bore by the progressive engagement of the tapered head with the cam arrangement.

20 Claims, 4 Drawing Sheets

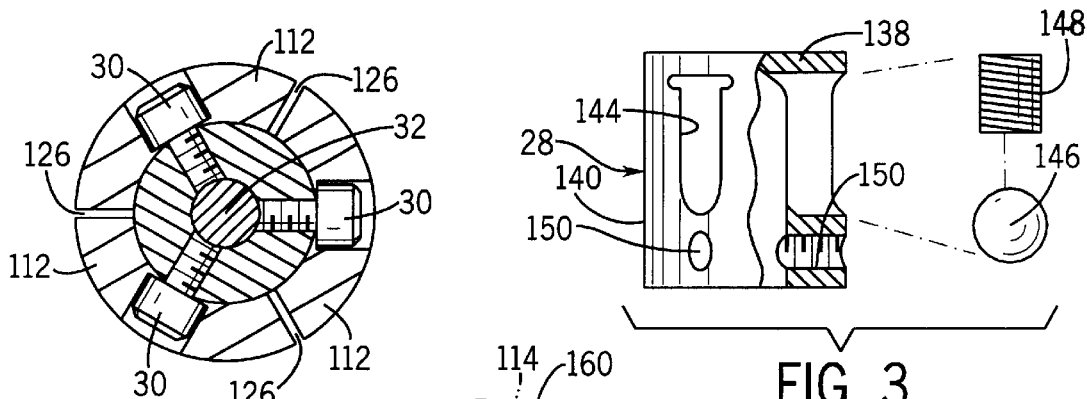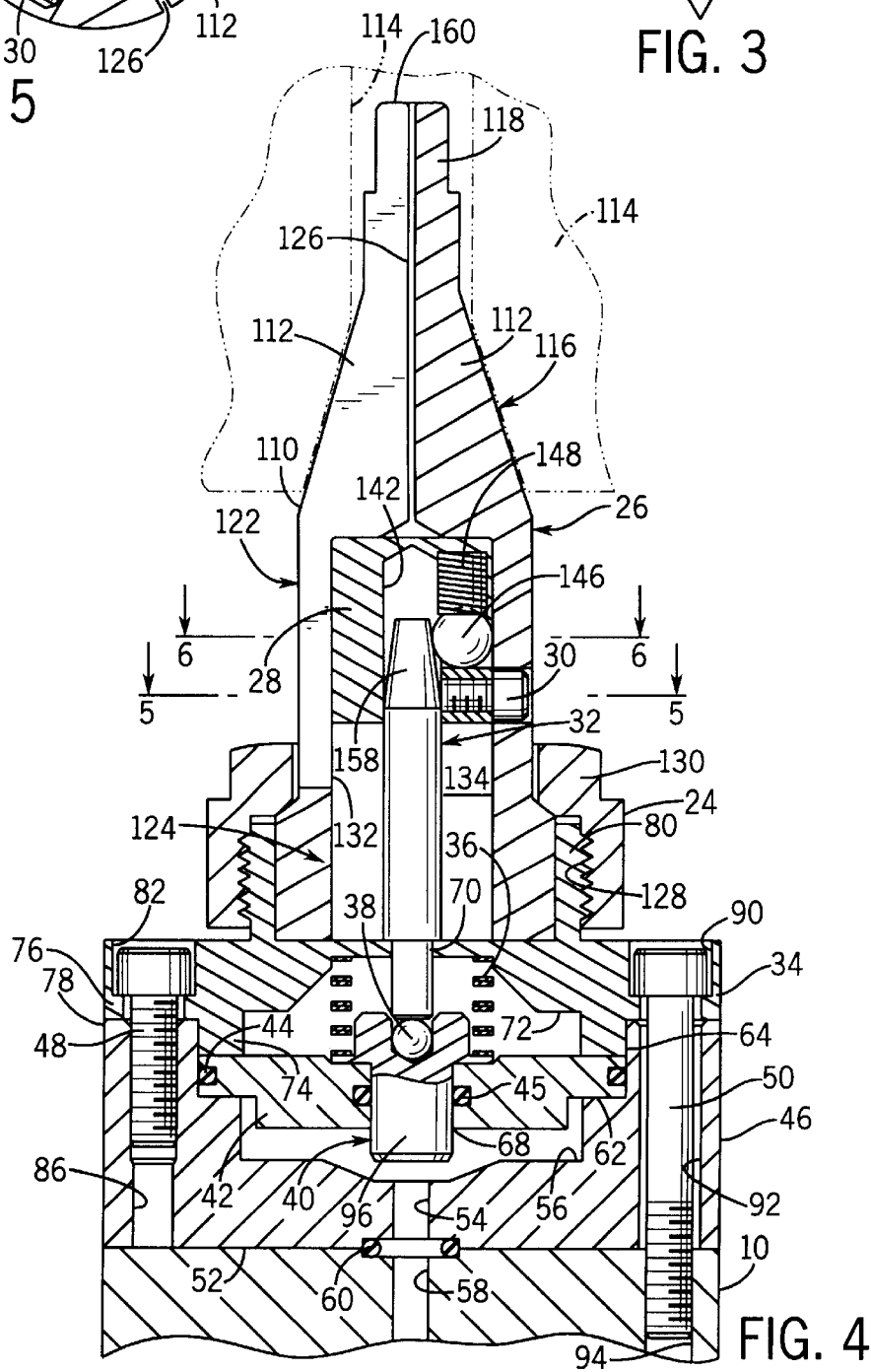

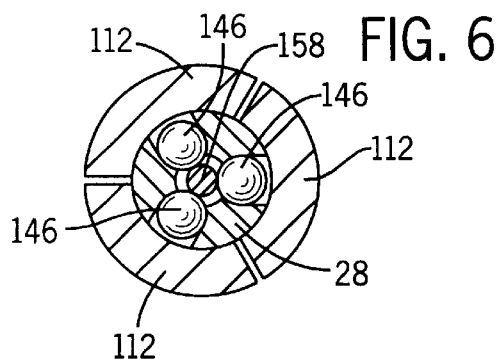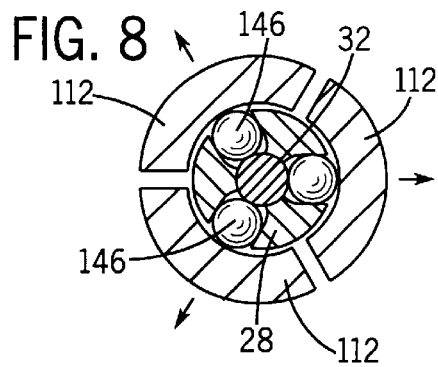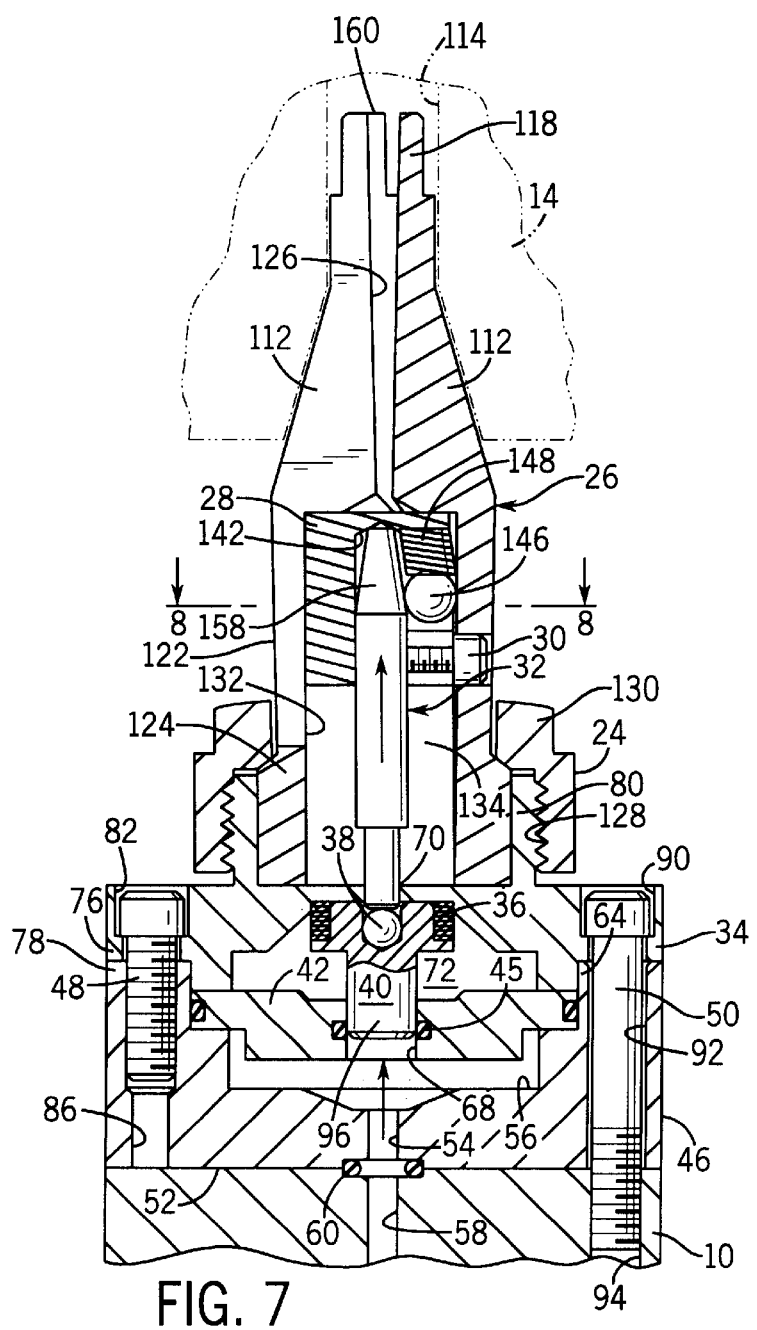

EXPANDABLE MANDREL

FIELD OF THE INVENTION

This invention relates broadly to support tooling for a workpiece, and more particularly, pertains to a fluid pressure-actuated, spring-return expandable mandrel for instantaneously gripping a workpiece during a machining process.

BACKGROUND OF THE INVENTION

A variety of tooling devices and designs have been employed for use as work supports to retain workpieces in a stable position during machining or other manufacturing operations on the workpiece. Such support tooling is important in applications where the workpiece must support accurate centering and level support. For example, the design of support tooling is critical in the machining of transmission plates, motorcycle engine covers and various other engine components.

One type of known workpiece support tooling is disclosed in U.S. Pat. No. 4,932,642, issued Jun. 12, 1990 to Salenbien et al. The support tooling of this device includes a spring-loaded sleeve member designed to engage the workpiece at a specific contact point about the shaft or bore of the workpiece. The weight of the workpiece drives the sleeve member to a second location, thereby causing a plurality of ball bearing members to move radially and engage the bore or shaft of the workpiece at a second point of contact. Because this device is dependent upon the disposition and removal of the workpiece, there are drawbacks in the amount of friction between the components, and in the desired responsiveness and positive gripping ability of the support tooling.

Many workpiece holders are clamping devices of one kind or another which rely on fluid pressure (hydraulic or pneumatic) to engage and disengage a workpiece under load. All of the clamping devices presently on the market suffer from at least some of the following disadvantages. These devices comprise a large number of parts having such exposed positions that they become sensitive to fouling and wear. In connection with machining, there is also a danger that cuttings may assemble on the different parts and prevent correct clamping. These devices also require a great deal of space and are often difficult to install and very expensive to manufacture. In addition, these devices operate with high friction levels which negatively effect the responsiveness of the workpiece holder and the efficiency of the machining process.

In order to maintain the integrity of the machining operations and avoid damage to workpieces, any workpiece holder used to maintain the workpiece in position should not readily slip, breakdown or excessively wear under significant loads typical to uses of such supports. Existing work support tooling suffers from one or more of these problems. Sometimes a problem manifests itself through slippage of the work support components causing loss of stable positioning and potential injury to workers. Other times, there may be unexpected physical failure of the work support and resulting change to the workpiece for interruption of machining operations.

Prior to the present invention, it is believed there has not been a reliable workpiece support of a simple, compact design that minimizes friction and utilizes a relatively small number of parts to provide optimum support and positive gripping of a workpiece using a reasonable amount of fluid pressure.

In addition, it has been difficult to achieve a workpiece holding system which grips one or more bores formed in the workpiece by means of an expandable structure having a reaction time which is substantially equal to its release time so as to improve the efficiency of the machining of the gripped workpiece.

Thus, it can be seen that a need exists for a workpiece holder and, more particularly, an expandable and retractable structure which will enable a quick change support and gripping apparatus capable of providing a desired leveling and centering of the workpiece.

SUMMARY OF THE INVENTION

It is one object of the present invention to provide a workpiece holder which, as far as possible, eliminates the above shortcomings of previously known workpiece supports and clamping devices, and which also make it possible to perform a highly efficient and precise gripping of the workpiece.

It is another object of the present invention to provide an expandable mandrel useful as a workpiece support whereby a gripping relationship may be reliably created and released with substantially reduced friction by selective application of relatively low fluid pressure and a biasing arrangement, respectively.

It is also an object of the present invention to provide a workpiece support structure having an expandable grip post with a tip which facilitates self-centering in relatively small bores formed in the workpiece.

It is a further object of the present invention to provide a workpiece holder whereby equal pressure is selectively applied to a plurality of expandable gripping sections.

It is an additional object of the present invention to provide a workpiece holder having an assembly which is interchangeable with variously-sized, expandable grip posts.

In one aspect of the invention, a workpiece holder includes a grip post having an interior wall structure and an exterior wall structure defining a plurality of expandable sections adapted to engage the wall of a bore formed on a workpiece. The grip post has a cam arrangement abutting the interior wall structure. A pin arrangement is movably mounted in the grip post and has a tapered head engageable with a cam arrangement. A system is provided for instantaneously imparting longitudinal movement to the pin arrangement whereby the exterior wall structure of the grip post is expanded into gripping relationship with the workpiece by the progressive engagement of the tapered head with the cam arrangement. The workpiece holder also includes a base assembly comprised of a base having a fluid passageway formed therein in communication with a source of fluid pressure, a cap joined to the base and formed with a central through hole for receiving the pin arrangement and a gland sealably interposed between the base and the cap and provided with a bore for receiving the pin arrangement. The bore is in aligned communication with the fluid passageway and through hole. The base assembly is adapted to be coupled to a manifold through which fluid pressure is delivered. The exterior wall structure of the grip post includes an upper portion having a nose-cone shape with a cylindrical tip, a middle portion of cylindrical configuration and a radially-enlarged lower portion of cylindrical contour. The expandable sections are formed by a set of cut lines spaced equidistantly from one another and extending from the tip to the lower portion of the grip post. The cap includes a threaded neck which surrounds the lower portion of the grip post and the grip post is coupled to the base assembly by a nut which is threadably received on the threaded neck. The interior wall structure forms a central chamber for accommodating a retainer having a top, a sidewall depending from the top, and a central opening extending along a longitudinal axis. A plurality of windows is formed in the sidewall and spaced equidistantly relative to the longitudinal axis. The windows form races for retaining the cam arrangement in the form of ball bearing components maintained in position by coil springs acting between the bearing components and the top of the retainer. The interior wall structure also includes a series of horizontally-disposed, threaded openings extending generally perpendicular to the longitudinal axis for receiving a set of screws passing through the exterior wall structure and the interior wall structure of the grip post for maintaining the retainer in an upper portion of the central chamber. The pin arrangement includes an elongated, cylindrical pin having a frusto-conically shaped head with a tip, the cylindrical pin having a first portion with a first diameter and a second portion having a second diameter less than the first portion diameter. The pin arrangement further includes a piston having a cylindrical body movably and sealably disposed in the bore of the gland, and a hat-shaped seat formed with a central pocket for holding a centering ball upon which the pin arrangement is supported. The seat includes an upstanding crown and a radially-enlarged rim having a bottom surface which is engageable with the gland, and a top surface for supporting the lower end of a wave spring that surrounds the crown and has an upper end engaged with the cap. The tapered head of the pin arrangement has a diameter progressively tapering toward the tip. The pin arrangement is axially slidable within the central opening formed in the retainer. The system for instantaneously imparting longitudinal movement to the pin arrangement is comprised of a fluid pressure source. In the preferred embodiment, the grip post has three equidistantly-spaced, expandable sections. A first set of fasteners is provided for joining the base and the cap together, while a second set of fasteners is provided for joining the base, the cap and the manifold together. The tip of the grip post is preferably provided with serrations to facilitate the gripping of the workpiece.

In another aspect of the invention, an expandable mandrel includes a base assembly having a fluid passageway in communication with a source of fluid pressure. A grip post has a plurality of expandable sections adapted to engage the wall of a bore formed on a workpiece and a central chamber having an interior wall for accommodating a retainer formed of a series of races, each race provided with a first resilient device for retaining a bearing component therein. A movable pin arrangement has an upper, tapered end engageable with the bearing components and a lower end supported in communication with the fluid passageway and surrounded by a second resilient device. When the wall defining the bore of the workpiece is positioned upon the grip post, fluid pressure delivered to the passageway will force the pin arrangement axially against the force of the second resilient device, whereby the tapered end of the pin arrangement deforms each first resilient device and forces the bearing components radially outward from the races against the interior wall of the central chamber causing the grip post sections to expand against the workpiece bore wall so that the workpiece is positively supported and gripped. Upon release of the fluid pressure from the passageway, each first resilient device and the second resilient device will return the pin arrangement in the opposite axial direction withdrawing the tapered end of the pin arrangement, so that each bearing component is forced back into its respective race by its first resilient device causing the grip sections to retract from the workpiece to instantaneously release the workpiece.

In yet another aspect of the invention, a workpiece holder has a plurality of components disposed in respective races engageable with a tapered end of an elongated member. The improvement resides in a system for supplying and regulating fluid pressure in the workpiece holder such that, upon application of fluid pressure, the elongated member moves axially in one direction so as to force the bearing components out of the races to enable the workpiece to be gripped on the holder. A resilient arrangement in the workpiece holder is operable upon release of fluid pressure to move the elongated member axially in the opposite direction so as to return the bearing components to their races to enable the workpiece to be released from the holder.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is an exploded view of a retainer used in the mandrel;

FIG. 4 is a cross-sectional view of the assembled mandrel in a non-actuated state;

FIG. 5 is a cross-sectional view taken on line 5—5 of FIG. 4;

FIG. 6 is a cross-sectional view taken on line 6—6 of FIG. 4;

FIG. 7 is a view like FIG. 4, but showing the mandrel in an actuated state; and

FIG. 8 is a view like FIG. 6, showing the radial expansion of the mandrel to support and positively hold a workpiece thereon.

DETAILED DESCRIPTION OF THE INVENTION

Figure 1:
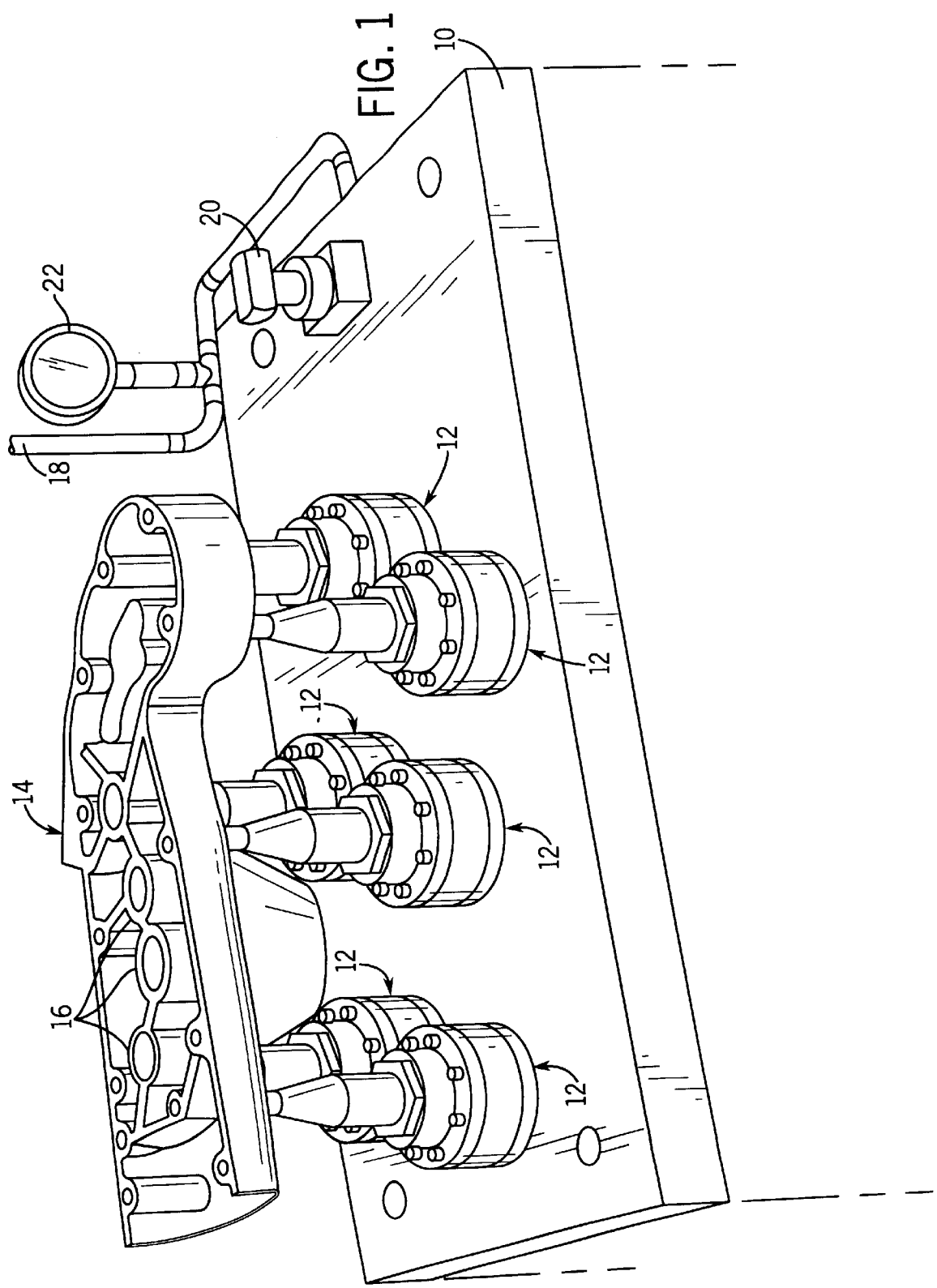
FIG. 1 is a perspective view of a workpiece to be machined supported and firmly retained by a series of mandrels embodying the present invention.

Referring now to FIG. 1, a manifold 10 is provided with a series of fluid pressure-actuated workpiece holders 12 embodying the present invention. The workpiece holders 12 are used to support and grip the walls of bores depending from a component 14, such as a motorcycle housing, which is to be machined on its inner surfaces 16. Manifold 10 is equipped with supply tubing 18 for delivering a source of hydraulic or pneumatic fluid via control valve 20 through appropriate internal passageways to the inside of each workpiece holder 12. Supply tubing 18 includes a conventional pressure gauge 22 for monitoring the fluid pressure throughout the manifold 10.

Figure 2:
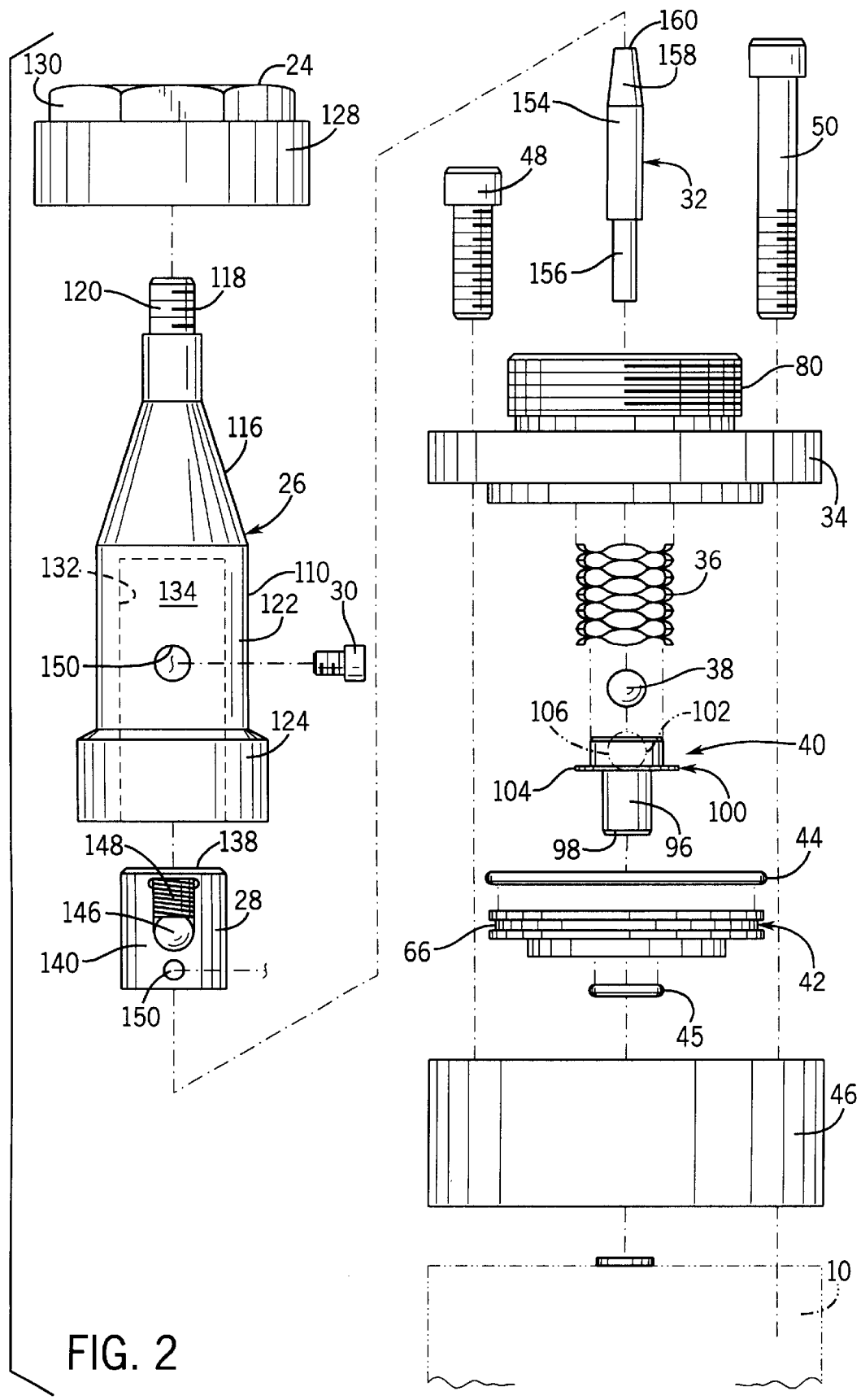
FIG. 2 is an exploded view of a single mandrel.

Turning to FIG. 2, each workpiece holder 10 is embodied in the form of an expandable mandrel comprised of a nut 24, a spire-like grip post 26, a ball bearing retainer 28 with a plurality of set screws (one being shown at 30), a tapered pin 32, a cap 34, a wave spring 36, a centering ball 38, a piston 40, a gland 42 with an outer O-ring 44 and an inner O-ring 45, a cylindrical base 46, a set of assembly bolts (one being seen at 48) and a set of anchor bolts (one being seen at 50).

At the outset, it should be understood that while the nut 24, the cap 34 and the base 46 are generally of a certain size, the grip post 26 may be variously-sized and shaped to accommodate the particular workpiece. As a result, different grip post configurations can be interchanged with the nut 24, the cap 34 and the base 46.

As seen in FIG. 4, base 46 has a bottom wall 52 which rests upon the top of manifold 10 and is formed with a fluid passageway 54 disposed centrally therein which opens into a stepped cavity 56. Fluid passageway 54 is aligned with an inlet 58 provided in the manifold 10, the inlet being in communication with the source of fluid pressure delivered through supply tubing 18. An O-ring 60 is positioned between the manifold 10 and the base 46 and around the aligned passageway 54 and inlet 58 to prevent fluid from entering into the base and manifold interface. The cavity 56 has a lateral shoulder 62 and an upright notch 64 upon which the gland 42 is supported. Gland 42 is provided with a circumferential groove 66 (FIG. 2) receiving O-ring 44 so as to seal the gland 42 and the base 46 and prevent passage of fluid from the interface formed therebetween. Gland 42 also is formed with a central bore 68 suitably grooved to accommodate inner O-ring 45 which prevents fluid from leaking through the bore 68. The cap 34 has a through-hole 70 which opens into a stepped hollow or void 72 in communication with gland bore 68, and receives a lower portion of the pin 32. The void 72 is formed by a circular ridge 74 that rests upon the gland 42 and abuts upright notch 60. Cap 34 also includes a radially, outwardly extending surface 76 which is supported by the periphery 78 of the base 46. In addition, cap 34 is provided with an integral, upstanding threaded neck portion 80 which is adapted to snugly receive the lower portion of the grip post 26 and be engaged with the nut 24 when the workpiece holder 12 is assembled. A first set of holes, one being seen at 82, is provided in the surface 76 of the cap 34 and is aligned with a first set of threaded holes (one being seen at 86) provided in the periphery 78 of the base 46. A set of assembly bolts, such as represented by 48, is utilized to join the cap 34 and the base 46 together. A second set of holes (one being seen at 90) is further provided in the surface 76 of the cap 34 between the first holes 82, and is aligned with a second set of holes, such as 92, formed in the periphery 78 of base 46 and a further set of threaded holes 94 formed in the upper surface of the manifold 10. A set of anchor bolts, such as 50, is employed to join the cap 34 and the base 46 to the manifold 10.

Piston 40 has a cylindrical body 96 which is movably and sealably disposed in the bore 68 of gland 42. The body 96 has a lower end 98 which in a first, non-actuated condition of FIG. 4, protrudes from the bore 68 into the gland cavity 56 and defines a reaction surface against which fluid pressure from passageway 54 is subjected. Formed integrally with the piston body 96 is a generally hat-shaped seat 100 (FIG. 2) having an upstanding crown 102 and a radially-enlarged rim 104. Crown 102 includes a central pocket 106 for holding the centering ball 38 upon which the pin 32 is supported. The rim 104 has a bottom surface which is engageable with the gland 42 and a top surface for supporting a lower end of the wave spring 36 which defines one resilient means. The spring 36 surrounds the crown 102 and has an upper end engaged with a central upper portion of the cap 34 encircling through hole 70.

The grip post 26 has an exterior wall structure 110 defining a plurality of expandable sections 112 adapted to engage the wall 114 of a bore formed on the workpiece 14. The exterior wall structure 110 includes an upper portion 116 having a nose-cone shape with a cylindrical tip 118 which may have grip-assisting serrations 120, as shown in FIG. 2. The grip post exterior wall structure 110 also includes a middle portion 122 of generally cylindrical configuration and a radially-enlarged lower portion 124 of generally cylindrical contour. The expandable sections 112 are formed by a set of three cut lines 126 (FIG. 5) spaced equidistantly from one another and extending from the tip 118 to the lower portion of grip post 26. It should be understood that the grip post 26 could have two cut lines if two expandable sections are desired. In the same vein, the grip post 26 may have more than three cut lines if more expandable sections are desired. The nut 24 has an internally-threaded, cylindrical lower section 128 which rotatably cooperates and couples with the threaded neck portion 80 of the cap 34. The nut 24 also has an integral hex-head 130 which surrounds and engages the middle and lower portions 122,124, respectively of the grip post 26.

The grip post 26 also has an interior wall structure 132 which forms a central chamber 134 for accommodating the ball bearing retainer 28 (FIG. 3) having a top 138 and a side wall 140 depending from the top 138. Retainer 28 also includes a central opening 142 extending along a longitudinal axis, and a plurality of three windows 144 spaced equidistantly relative to the longitudinal axis. The windows 144 define races for retaining a cam arrangement in the form of three ball bearing components 146 (FIG. 6), maintained in position by three coil springs 148 defining another resilient means and acting between the bearing components 146 and the top 138 of the retainer 28. A series of three horizontally-disposed, threaded openings 150 extend generally perpendicular to the longitudinal axis for receiving group of three set screws 30 which pass through the exterior wall structure 110 and the interior wall structure 132 of the grip post 26 for maintaining the retainer 28 in an upper portion of the chamber 134. As best seen in FIGS. 4 and 5, the set screws 30 are dimensioned such that when completely screwed into place they will not interfere with or engage the pin 32.

Pin 32 has an elongated, cylindrical shape having an upper portion 154 (FIG. 2) with a first diameter and a lower portion 156 which has a second diameter less than the first diameter, and passes through the through-hole 70 formed in the cap 34. In the non-actuated condition of FIG. 4, the enlarged bottom end of the pin upper portion 154 sits upon an upper surface of cap 34, and the bottom end of the lower portion 156 rests upon centering ball 38. The pin 32 also has a frusto-conically shaped, tapered head 158 having a diameter which tapers progressively upwardly towards the tip 160. Together, the pin 32, the centering ball 38, and the piston 40 define a pin arrangement movably mounted for selective movement upwardly and downwardly within the grip post 26. During such movement, the tapered head 158 and upper portion 154 of the pin are axially slidable within the central opening 142 formed in retainer 28.

When it is desired to use the above-described expandable mandrel 12, the wall 114 defining the bore of a workpiece 14 is positioned over the uppermost portion of the grip post 26, as shown in the non-actuated condition of FIG. 4. In the actuated condition of FIG. 6, fluid pressure from a suitable source is delivered through the manifold inlet 58 in base passageway 54 against the bottom end 98 of piston 40, so as to force the pin arrangement axially and upwardly against the force of wave spring 36. With this motion, the tapered head 158 of the pin arrangement deforms the coil springs 148 in retainer 28 and forces the bearing components 146 radially outward from their races 144 against the interior wall 132 of central chamber 134. This causes the grip post sections 112 to expand against the workpiece bore wall 114, so that the workpiece 14 is positively supported and gripped. One of the advantages in the present design is that the fluid pressure, for example, pneumatic pressure, is at a relatively low pressure, i.e. 900 to 1,400 psi, and the pin 32 slides in the grip post 26 with a minimum of frictional engagement. This combination enables the workpiece holder to have an extremely fast and instantaneous reaction time to expand the sections 112 into contact with the workpiece bore. Because of the equidistant spacing of the bearing components 146, radial expansion will provide a self-centering of the expandable sections 112 in the workpiece bore and further enable the leveling of the workpiece 14 in order to establish accuracy during machining thereof. The present invention is particularly efficient in gripping small diameter workpiece bores and makes use of the tip serrations 120 to improve the gripability.

When machining has been finished and it is desired to remove the workpiece 14 from the mandrel 12, fluid pressure is released from passageway 54, so that the wave spring 36 and coil springs 148 will return the pin arrangement in an opposite axial direction. This downward motion will withdraw the tapered end 158 of the pin arrangement so that each bearing component 146 is forced back into its respective race 144 by the respective coil spring 148. As a result, the grip sections 112 retract from the workpiece 114 to instantaneously release the workpiece 14 at substantially the same rate as when the pin 32 is used to expand the sections 112.

It should be appreciated that the present invention provides an improved workpiece holder 12 which eliminates the drawbacks of the prior art clamping devices and non-fluid pressure-actuated workpiece holder designs. Also, the present invention provides an expanded mandrel 12 which has a relatively compact design which is markedly reliable and easy to assemble and disassemble. Furthermore, the present invention provides a workpiece holder 12 whereby equal pressure is selectively applied to a plurality of expandable gripping sections 112.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A workpiece holder comprising in combination:

a grip post having an interior wall structure and an exterior wall structure defining a plurality of expandable sections adapted to engage the wall of a bore formed on a workpiece, the grip post having a cam arrangement abutting the interior wall structure;

a pin arrangement movably mounted in the grip post and having a tapered head engageable with the cam arrangement;

means for instantaneously imparting longitudinal movement to the pin arrangement whereby the exterior wall structure of the grip post is expanded into gripping relationship with the workpiece by the progressive engagement of the tapered head with the cam arrangement, and a base assembly comprised of a base having a fluid passageway formed therein in communication with a source of fluid pressure, a cap joined to the base and formed with a central through hole for receiving the pin arrangement, and a gland sealably interposed between the base and the cap and provided with a bore for receiving the pin arrangement, the bore being in aligned communication with the fluid passageway and the through hole.

2. A workpiece holder comprising in combination:

a grip post having an interior wall structure and an exterior wall structure defining a plurality of expandable sections adapted to engage the wall of a bore formed on a workpiece, the grip post having a cam arrangement abutting the interior wall structure and a first resilient means acting directly upon the cam arrangement;

a pin arrangement movably mounted in the grip post and having a tapered head engageable with the cam arrangement and a second resilient means surrounding the pin arrangement; and means for instantaneously imparting longitudinal movement in one direction to the pin arrangement against forces of the first and second resilient means whereby the exterior wall structure of the grip post is expanded into gripping relationship with the workpiece by the progressive engagement of the tapered head with the cam arrangement, the first and second resilient means acting to return the pin arrangement in an opposite direction to the one direction causing the grip post sections to retract from the workpiece.

3. The workpiece holder of claim 1, wherein the base assembly is adapted to be coupled to a manifold through which fluid pressure is delivered.

4. The workpiece holder of claim 1, wherein the exterior wall structure of the grip post includes an upper portion having a nose-cone shape with a cylindrical tip, a middle portion of cylindrical configuration and a radially-enlarged lower portion of cylindrical contour.

5. The workpiece holder of claim 4, wherein the expandable sections are formed by a set of cut lines spaced equidistantly from one another and extending from the tip to the lower portion of the grip post.

6. The workpiece holder of claim 4, wherein the cap includes a threaded neck which surrounds the lower portion of the grip post, and the grip post is coupled to the base assembly by a nut which is threadably received on the threaded neck.

7. The workpiece holder of claim 1, wherein the interior wall structure forms a central chamber for accommodating a retainer having a top, a sidewall depending from the top, a central opening extending along a longitudinal axis, a plurality of windows formed in the sidewall and equidistantly spaced relative to the longitudinal axis and forming races for retaining the cam arrangement in the form of ball bearing components thereof maintained in position by coil springs acting between the bearing components and the top of the retainer, and a series of horizontally-disposed threaded openings extending generally perpendicular to the longitudinal axis for receiving a set of screws passing through the exterior wall structure and the interior wall structure of the grip post for maintaining the retainer in an upper portion of the central chamber.

8. The workpiece holder of claim 1, wherein the pin arrangement includes an elongated, cylindrical pin having a frustoconically-shaped head with a tip, the cylindrical pin having a first portion with a first diameter and a second portion having a second diameter less than the first portion diameter, and a piston having a cylindrical body movably and sealably disposed in the bore of the gland, and a hat-shaped seat formed with a central pocket for holding a centering ball upon which the pin arrangement is supported.

9. The workpiece holder of claim 8, wherein the seat includes an upstanding crown and a radially-enlarged rim having a bottom surface which is engageable with the gland, and a top surface for supporting a lower end of a wave spring that surrounds the crown and has an upper end engaged with the cap.

10. The workpiece holder of claim 8, wherein the tapered head of the pin arrangement has a diameter progressively tapering towards the tip.

11. The workpiece holder of claim 7, wherein the pin arrangement is axially slidable within the central opening formed in the retainer.

12. The workpiece holder of claim 1, wherein the means for instantaneously imparting longitudinal movement to the pin arrangement is comprised of fluid pressure means.

13. The workpiece holder of claim 1, wherein the grip post has three equidistantly-shaped expandable sections.

14. The workpiece holder of claim 1, including a first set of fasteners for joining the base and the cap together.

15. The workpiece holder of claim 3, including a second set of fasteners for joining the base, the cap and the manifold together.

16. The workpiece holder of claim 4, wherein the tip of the grip post is provided with serrations to facilitate the gripping of the workpiece.

17. An expandable mandrel comprising:

a base assembly having a fluid passageway in communication with a source of fluid pressure;

a grip post having a plurality of expandable sections adapted to engage the wall of a bore formed on a workpiece and a central chamber having an interior wall for accommodating a retainer formed of a series of races, each race provided with a first resilient means for retaining a bearing component therein, and a movable pin arrangement having an upper tapered end engageable with the bearing components and a lower end supported in communication with the fluid passageway and surrounded by a second resilient means, such that when the wall defining the bore of the workpiece is positioned upon the grip post, fluid pressure delivered to the passageway will force the pin arrangement axially against the force of the second resilient means, whereby the tapered end of the pin arrangement deforms each first resilient means and forces the bearing components radially outward from their races against the interior wall of the central chamber causing the grip post sections to expand against the workpiece bore wall so that the workpiece is positively supported and gripped.

18. The expandable mandrel of claim 17, wherein upon release of the fluid pressure from the passageway, each first resilient means and the second resilient means will return the pin arrangement in the opposite axial direction withdrawing the tapered end of the pin arrangement so that each bearing component is forced back into its respective race by its first resilient means causing the grip sections to retract from the workpiece to instantaneously release the workpiece.

19. In a workpiece holder having a plurality of components disposed in respective races engageable with a tapered end of an elongated member, the improvement residing in:

means for supplying and regulating fluid pressure in the workpiece holder such that, upon application of fluid pressure, the elongated member moves axially in one direction so as to force the bearing components out of the races to enable the workpiece to be gripped on the holder; and resilient means in the workpiece holder acting directly upon the bearing components and the elongated member, and operable upon release of fluid pressure to move the elongated member axially in an opposite direction to the one direction so as to return the bearing components to their races to enable the workpiece to be released from the holder.

20. The workpiece holder of claim 2, including a base assembly comprised of a base having a fluid passageway formed therein in communication with a source of fluid pressure, a cap joined to the base and formed with a central through hole for receiving the pin arrangement, and a gland sealably interposed between the base and the cap and provided with a bore for receiving the pin arrangement, the bore being in aligned communication with the fluid passageway and the through hole.

* * * * *